(No Model.)
L. BERGEN.
FAUCET.
No. 255,914. Patented Apr. 4, 1882.
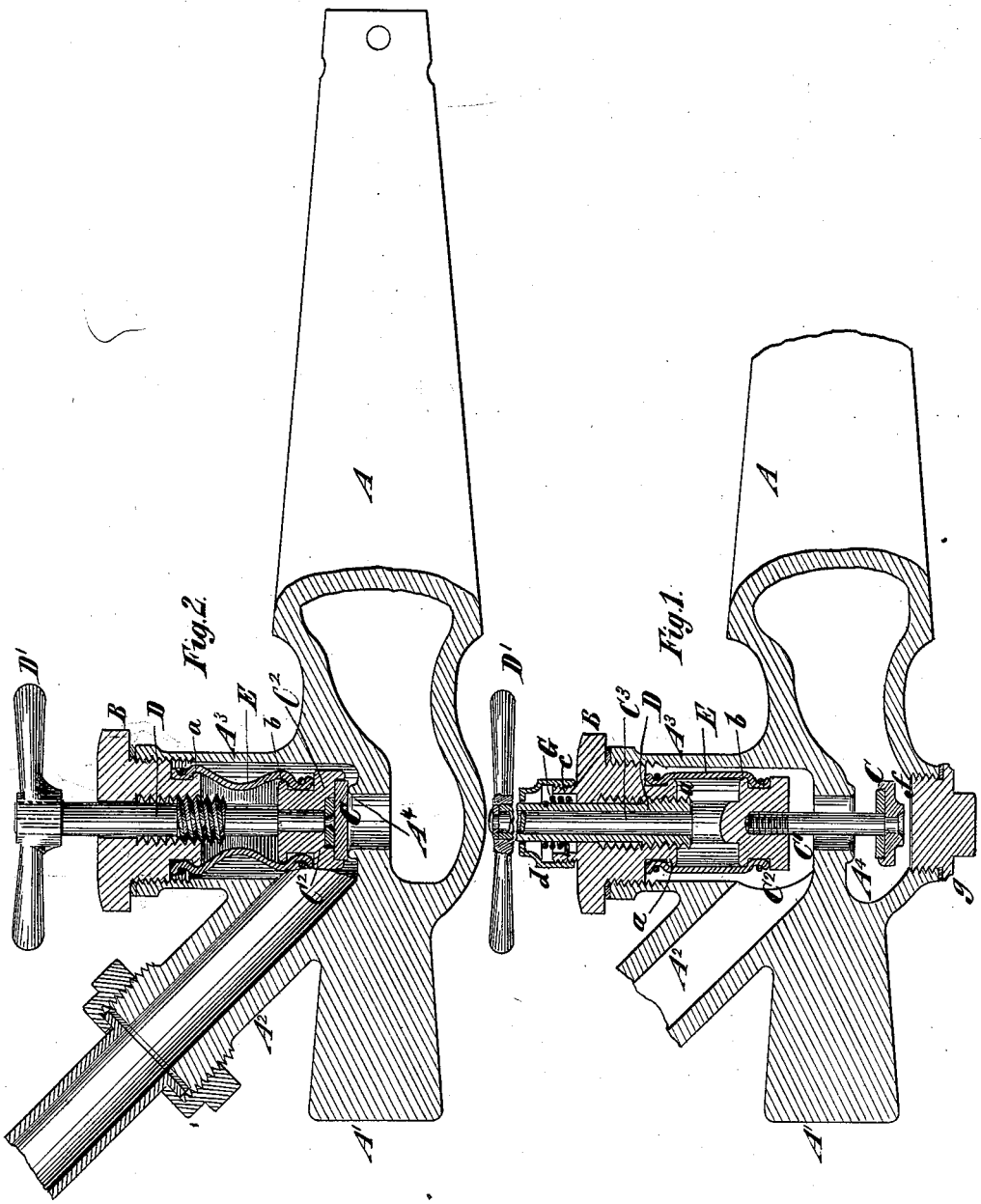
Witnesses
J. J. Keane
Theo. F. Haynes
Inventor
Louis Bergen
By his Attorney
Edwin H. Brown.
N. PETERS. Photo-Lithographer, Washington, D. C.

UNITED STATES PATENT OFFICE.

LOUIS BERGEN, OF NEW YORK, N. Y.

FAUCET.

SPECIFICATION forming part of Letters Patent No. 255,914, dated April 4, 1882.

Application filed May 18, 1881. (No model.)

*To all whom it may concern:*

Be it known that I, LOUIS BERGEN, of the city of New York, in the county and State of New York, have invented certain new and useful Improvements in Faucets and Cocks, of which the following is a specification.

The object of my present improvements is to effectually prevent leakage around the operating-stem of a faucet or cock while the valve is open, and especially where the faucet or cock is employed for liquids under pressure.

The improvements consist in the combination, in a faucet or cock, of a disk, a valve carried by said disk and so connected therewith that the passage of liquid from the under to the upper side of said disk is effectually precluded, a screw for adjusting said disk to shift the valve into or out of contact with its seat and having a swiveling connection with said disk, a removable cap or plug in which said screw works, and an elastic or flexible sleeve of packing material loosely surrounding said screw and fitting outside the adjacent edges of said disk and said cap or plug, whereby leakage through said cap or plug is effectually prevented. The valve may be swiveled to the end of its stem, or it may be fixed on the same, and the screw whereby it is operated may be swiveled to said stem.

In the accompanying drawings, Figure 1 is a central longitudinal section of a faucet or cock embodying my improvements; and Fig. 2 is a similar view of a faucet or cock which also embodies my improvements, but is of a somewhat modified form.

Similar letters of reference designate corresponding parts in both figures.

Referring first to Fig. 1, A designates the body of the faucet or cock, which may be of the usual or any other suitable form. It is intended to be made of any appropriate metal, and, as shown, is made of taper form, so that it may be easily driven into a barrel or other receptacle for liquor. It is also shown as having a head, A', which may be struck with a mallet or other utensil to drive the faucet or cock into such receptacle. Instead of the ordinary spout, it is shown as having a nozzle, $A^2$, which may be coupled to a pipe for conveying liquid to a distant place; but this is immaterial so far as my present improvements are concerned.

$A^3$ designates a socket extending from the body A, and adapted to receive the valve and its appurtenances, and also a cap or plug, B, which is screwed into the outer end of the same.

C designates a valve operating on the side of a seat, $A^4$, which is farthest from the socket $A^3$. It is furnished with the usual packing and with a rod, C', which is connected by screw-threads or otherwise with a disk, $C^2$, which is rigidly affixed to a rod, $C^3$. These rods C' and $C^3$ may be regarded as constituting the valve-stem. The valve and the rod C' are introduced into the body A through an aperture, $f$, fitted with the plug $g$. The hole in the disk $C^2$, into which the rod C' is screwed, does not extend through said disk, and hence liquid cannot pass from its under to its upper side.

D designates a screw whereby the said valve is operated, and which works in the cap or plug B. The rod $C^3$ extends through and is swiveled within the screw D, so that the latter may be rotated or turned without rotating or turning the valve. Thus a swiveling connection between the valve and its operating-screw is obtained. A handle, D', of any suitable kind may be used upon this screw for operating it.

E designates a sleeve, of india-rubber or other flexible or elastic packing material, fitting outside a flange or rim, $a$, on the cap or plug B and a flange or rim, $b$, on the disk $C^2$ with which the valve C is connected, and loosely surrounding the screw D. It may be bound tightly over these flanges or rims with wire or cord, if desirable. When the valve is open the pressure of the liquid which flows beyond the valve-seat tends to hold this sleeve E tightly on the said flanges or rims, and hence leakage around the screw D is obviated. A washer placed between the flange of the cap or plug B and the end of the socket in which it fits precludes leakage between these parts. If preferred, a spiral spring, G, may be attached at one end to the shank of the screw D, then wound around the same and attached to a rim, $c$, projecting from the cap or plug B, so as to close the valve after it has been opened. The thread of the screw D may then be made of a quick pitch. A cover, $d$, may be fitted over this spring and screwed upon the rim $c$.

Referring now to Fig. 2, the body, nozzle, and valve-seat are the same; but the valve C operates on the opposite side of the seat $A^4$.

The sleeve E, of flexible or elastic packing material, fits over the cap or plug B and the disk $C^2$ of the valve C. It may be fastened to them by wire or cord wound around them. The disk $C^2$ and screw D have a swiveling connection, the lower end of the screw passing through the disk; but the lower face of the disk is covered by the valve C, which precludes leakage from the under to the upper side of the disk around the screw.

It will be seen that by my invention I produce a faucet or cock wherein, even with liquids under pressure, there is little liability of leakage.

What I claim as my invention, and desire to secure by Letters Patent, is—

1. The combination, in a faucet or cock, of a disk, a valve carried by said disk and so connected therewith that the passage of liquid from the under to the upper side of said disk is effectually precluded, a screw for adjusting said disk to shift the valve into or out of contact with its seat, and having a swiveling connection with said disk, a removable cap or plug in which said screw works, and an elastic or flexible sleeve of packing material loosely surrounding said screw and fitting outside the adjacent edges of said disk and said cap or plug, whereby leakage through said cap or plug is effectually prevented, substantially as specified.

2. The combination, in a faucet or cock, of a disk carrying a valve, a screw for shifting the disk to move the valve to and from its seat and receiving the stem of the disk within it, a removable cap or plug in which said screw works, and an elastic or flexible sleeve of packing material fitting outside the adjacent edges of said cap or plug and of said disk, substantially as specified.

3. The combination, in a faucet or cock, of a valve, and a screw for operating the valve, the said valve having a stem extended up into the said screw and swiveled therein, substantially as specified.

LOUIS BERGEN.

Witnesses:
T. J. KEANE,
FREDK. HAYNES.